(12) United States Patent
Uchino et al.

(10) Patent No.: US 12,486,425 B2
(45) Date of Patent: Dec. 2, 2025

(54) POLYESTER-RESIN-COATED SEAMLESS CAN AND METHOD FOR MANUFACTURING THE SAME

(71) Applicant: Toyo Seikan Co., Ltd., Tokyo (JP)

(72) Inventors: Shota Uchino, Yokohama (JP); Seitaro Kanazawa, Yokohama (JP); Shiori Adachi, Yokohama (JP); Noriyoshi Obara, Tokyo (JP); Wataru Kurokawa, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 537 days.

(21) Appl. No.: 17/925,653

(22) PCT Filed: May 17, 2021

(86) PCT No.: PCT/JP2021/018667
§ 371 (c)(1),
(2) Date: Nov. 16, 2022

(87) PCT Pub. No.: WO2021/235403
PCT Pub. Date: Nov. 25, 2021

(65) Prior Publication Data
US 2023/0183519 A1    Jun. 15, 2023

(30) Foreign Application Priority Data

May 22, 2020   (JP) ................................ 2020-089918

(51) Int. Cl.
| C09D 167/02 | (2006.01) |
| B65D 1/02 | (2006.01) |
| B65D 1/16 | (2006.01) |
| B65D 1/48 | (2006.01) |
| B65D 23/08 | (2006.01) |

(52) U.S. Cl.
CPC ....... *C09D 167/025* (2013.01); *B65D 1/0207* (2013.01); *B65D 1/023* (2013.01);
(Continued)

(58) Field of Classification Search
None
See application file for complete search history.

(56) References Cited

U.S. PATENT DOCUMENTS

| 5,228,588 A | 7/1993 | Aizawa et al. |
| 5,700,529 A * | 12/1997 | Kobayashi ............. B21D 51/26 |
| | | 72/46 |

(Continued)

FOREIGN PATENT DOCUMENTS

| EP | 0 830 938 A1 | 3/1998 |
| JP | 7-223645 A | 8/1995 |

(Continued)

OTHER PUBLICATIONS

International Search Report for PCT/JP2021/018667 dated Aug. 3, 2021.

(Continued)

*Primary Examiner* — Yan Lan
(74) *Attorney, Agent, or Firm* — Sughrue Mion, PLLC (57) ABSTRACT

A polyester-resin-coated seamless can including a reduced diameter portion obtained by neck processing within a distance of 0% to 15% from a can body uppermost portion with respect to a total height of the can from the can body uppermost portion to a can bottom of the can. A ratio Im/Iu is 1.0 or more, where Iu (cps/μm) is calculated by dividing a maximum peak intensity in a range satisfying 15°≤2θ≤19° of an outer-surface coating in a maximum reduced diameter portion of the reduced diameter portion by a thickness of the coating at the measurement site, and Im (cps/μm) is calculated by dividing a maximum peak intensity in a range satisfying 15°≤2θ≤19° of outer-surface coating at a measurement site within a distance of 45% to 60% from the can body uppermost portion by a thickness of the outer-surface coating at the measurement site.

8 Claims, 1 Drawing Sheet

(52) U.S. Cl.
CPC .......... *B65D 1/0276* (2013.01); *B65D 1/165* (2013.01); *B65D 1/48* (2013.01); *B65D 23/0821* (2013.01)

(56) References Cited

U.S. PATENT DOCUMENTS

| | | | |
|---|---|---|---|
| 5,759,651 | A | 6/1998 | Machii et al. |
| 2002/0102419 | A1 | 8/2002 | Kawahara et al. |
| 2005/0053796 | A1 | 3/2005 | Kawahara et al. |
| 2016/0257099 | A1 | 9/2016 | Yamanaka et al. |
| 2020/0122431 | A1* | 4/2020 | Ooshima ................ B32B 15/09 |

FOREIGN PATENT DOCUMENTS

| | | | |
|---|---|---|---|
| JP | 7-330924 | A | 12/1995 |
| JP | 8-244750 | A | 9/1996 |
| JP | 9-122799 | A | 5/1997 |
| JP | H09122799 | * | 5/1997 |
| JP | 11-138693 | A | 5/1999 |
| JP | 2008-143184 | A | 6/2008 |
| JP | 2013-212842 | A | 10/2013 |
| JP | 2015-89643 | A | 5/2015 |
| JP | 2019-14118 | A | 1/2019 |
| WO | 90/09321 | A1 | 8/1990 |
| WO | 2015/064100 | A1 | 5/2015 |

OTHER PUBLICATIONS

Supplementary European Search Report issued Jun. 18, 2024 in Application No. 21807715.4.

Extended European Search Report dated Oct. 9, 2024 in application No. 21807715.4.

* cited by examiner

POLYESTER-RESIN-COATED SEAMLESS CAN AND METHOD FOR MANUFACTURING THE SAME

CROSS REFERENCE TO RELATED APPLICATIONS

This application is a National Stage of International Application No. PCT/JP2021/018667 filed May 17, 2021, claiming priority based on Japanese Patent Application No. 2020-089918 filed May 22, 2020.

TECHNICAL FIELD

The present disclosure relates to a polyester-resin-coated seamless can and a method for manufacturing the seamless can, and more particularly relates to a polyester-resin-coated seamless can having excellent adhesion of a polyester resin coating, and having excellent corrosion resistance and retort resistance and a method for manufacturing the seamless can.

BACKGROUND

A widely used seamless can be produced by subjecting a polyester-resin-coated metal sheet in which a metal sheet is coated with a polyester resin coating to forming such as drawing, drawing/redrawing, drawing/ironing, or thinning drawing/ironing.

For seamless cans used in beverages or food applications, a retort sterilization treatment is performed after the contents are filled. Since such a retort sterilization treatment is performed under high-temperature and high-humidity conditions, a problem called retort brushing (white spots) has arisen, in which parts such as a can bottom portion to which water droplets have adhered crystallize and cause whitening.

In order to solve the problem of retort brushing, it has been proposed to use a copolymerized polyester containing polybutylene terephthalate as a polyester resin film.

For example, JP 7-330924 A discloses, as a film with excellent retort resistance, a stretched polyester film for metal bonding and forming. The stretched polyester film includes: 99 wt. % to 60 wt. % of polyester having a melting point of 210° C. to 245° C. and a glass transition temperature of 60° C. or more; and 1 wt. % to 40 wt. % of polyester mainly containing polybutylene terephthalate having a melting point of 180° C. to 223° C. In the stretched polyester film, the content of a free monomer is 300 ppm or less.

Furthermore, JP 2008-143184 A discloses, as a laminated metal sheet for metal can bodies and can lid materials, which does not cause whitening of a film even when the film is crystallized, a metal laminate plate in which 10 to 70 wt. % of a polyethylene terephthalate resin and 90 to 30 wt. % of a polybutylene terephthalate resin are blended, the metal laminate plate having two or more melting point peaks.

SUMMARY

However, when the polyester film described in the related art in which the polyethylene terephthalate resin (may be referred to as "PET") and the polybutylene terephthalate resin (hereinafter, referred to as "PBT") are blended has a small content of PBT and is exposed to high-temperature high-humidity conditions after the contents are filled, as in a case of a sterilization treatment such as a retort sterilization treatment or a steaming treatment, the polyester film cannot sufficiently suppress whitening such as retort brushing that occurs on a can bottom portion with an outer-surface resin coating. In addition, when the entire can is exposed to high-temperature conditions during the heating for the purpose of removing lubricants and alleviating forming strain in the can manufacturing, the polyester film cannot sufficiently suppress the occurrence of appearance defects called white streaks where some of the can bottom portion is whitened linearly. On the other hand, if the PBT content is too high, the resin coating may be scraped off during the drawing and ironing, resulting in exposure of the metal and deterioration in the appearance properties after printing. In addition, there is a new problem in which the adhesion to the metal sheet is deteriorated, and the resin coating is peeled off (delamination) from a neck portion during retort sterilization treatment, and it is not sufficiently satisfied only by containing PBT.

Accordingly, an object of the present invention is to provide a polyester-resin-coated seamless can, the seamless can suppressing the occurrence of white spots even when exposed to high-temperature high-humidity conditions such as a retort sterilization treatment, and suppressing the occurrence of whitening such as white streaks is suppressed even when the entire can is exposed to high-temperature conditions during the heating process, and also having the excellent adhesion of the resin coating, and a method for manufacturing the seamless can.

The present disclosure provides a seamless can in which a polyester resin coating is formed on at least an outer surface of a metal sheet. The seamless can includes a reduced diameter portion obtained by neck processing within a distance of 0% to 15% from a can body uppermost portion with respect to a total height of the seamless can from the can body uppermost portion to a can bottom of the seamless can. A ratio Im/Iu is 1.0 or more, where Iu is a value (cps/μm) calculated by dividing a maximum value of peak intensity in a range satisfying $15° \leq 2\theta \leq 19°$ of an outer-surface polyester resin coating based on an X-ray diffraction method at a measurement site in a maximum reduced diameter portion of the reduced diameter portion by a thickness of the polyester resin coating at the measurement site, and Im is a value (cps/μm) calculated by dividing a maximum value of peak intensity in a range satisfying $15° \leq 2\theta \leq 19°$ of an outer-surface polyester resin coating based on an X-ray diffraction method at a measurement site within a distance of 45% to 60% from the can body uppermost portion by a thickness of the outer-surface polyester resin coating at the measurement site.

In the seamless can of the first aspect of the present disclosure, it is preferable that (1) the maximum reduced diameter portion have the diameter reduced by a diameter reduction rate of 6% or less with respect to a diameter of a can body at a position 15% to 60% from the can body uppermost portion, (2) the outer-surface polyester resin coating contain 40 mass % to 80 mass % of ethylene terephthalate and 20 mass % to 60 mass % of butylene terephthalate as main constituents, (3) a printed layer be formed on the outer-surface polyester resin coating layer in at least part of the reduced diameter portion, (4) the polyester resin coating containing polyethylene terephthalate as a main component be formed as a resin coating on an inner surface of the metal sheet, (5) a ratio Wm/Wu be 0.85 or less, where Wu is a full width at half maximum (FWHM) (cm$^{-1}$) of a peak near 1,730 cm$^{-1}$ based on microscopic Raman spectroscopy of the inner-surface polyester-resin-coated surface at the maximum reduced diameter portion, and Wm is full width at half maximum (FWHM) ($cm^{-1}$) of a peak near 1,730 $cm^{-1}$ based on the microscopic Raman spectroscopy of the inner-surface polyester-resin-coated surface at a position within 45% to 60% of the distance from the can body uppermost portion, (6) an orientation index MOu based on the microscopic Raman spectroscopy of the inner-surface polyester-resin-coated surface at the maximum reduced diameter portion be 2.40 or less, and (7) a ratio MOm/MOu of an orientation index MOm based on the microscopic Raman spectroscopy of the inner-surface polyester-resin-coated surface at a position within 45% to 60% of the distance from the can body uppermost portion to the orientation index MOu be 2.10 or more.

The present disclosure provides another seamless can in which polyester resin coating is formed on at least an inner surface of a metal sheet. The seamless can includes a reduced diameter portion obtained by neck processing within a distance of 0% to 15% from a can body uppermost portion with respect to a total height of the seamless can from the can body uppermost portion to a can bottom of the seamless can. A melting point of a polyester resin is 250° C. or more. In a state before the seamless can undergoes a sterilization treatment to suppress spoilage of contents, an orientation index MOu based on the microscopic Raman spectroscopy of the inner-surface polyester-resin-coated surface at the maximum reduced diameter portion is 3.60 or less.

In the seamless can of a second aspect of the present disclosure, it is preferable that (1) the maximum reduced diameter portion have a diameter reduced at a diameter reduction rate of 15% or more with respect to a diameter of the can body at a position of 15% to 60% from the can body uppermost portion, (2) a ratio MOm/MOu of the orientation index MOm based on the microscopic Raman spectroscopy of the polyester-resin-coated surface at a position within a distance of 45% to 60% from the can body uppermost portion to the orientation index MOu be 1.80 or more, (3) the orientation index MOu be 4.10 or less in a state after the seamless can undergoes the sterilization treatment for suppressing spoilage of the contents, and (4) the ratio MOm/MOu of the orientation index MOm based on the microscopic Raman spectroscopy of the polyester-resin-coated surface at a position within a distance of 45% to 60% from the can body uppermost portion to the orientation index MOu be 1.37 or more.

The present disclosure further provides another seamless can in which polyester resin coating is formed on at least an inner surface of a metal sheet. The seamless can includes a reduced diameter portion obtained by neck processing within a distance of 0% to 15% from a can body uppermost portion with respect to a total height of the seamless can from the can body uppermost portion to a can bottom of the seamless can. A melting point of a polyester resin is 220° C. or less. In a state after the seamless can undergoes a sterilization treatment to suppress spoilage of contents, a ratio MOm/MOu of an orientation index MOm based on microscopic Raman spectroscopy of a polyester-resin-coated surface at a position within a distance of 45% to 60% from the can body uppermost portion to an orientation index MOu based on the microscopic Raman spectroscopy of an inner-surface polyester-resin-coated surface in the maximum reduced diameter portion is 1.37 or more.

In the seamless can of a third aspect of the present disclosure, it is preferable that (1) the maximum reduced diameter portion have a diameter reduced at a diameter reduction rate of 15% or more with respect to a diameter of the can body at a position of 15% to 60% from the can body uppermost portion, and (2) the metal sheet be an aluminum sheet not subjected to a surface treatment, and the orientation index MOu based on the microscopic Raman spectroscopy of the inner-surface polyester-resin-coated surface in the maximum reduced diameter portion be 3.10 or less.

The present disclosure further provides a method for manufacturing a seamless can. The method includes forming a shallow-drawn can by drawing using a polyester-resin-coated metal sheet in which a polyester resin coating is formed on an inner surface and/or an outer surface; forming a drawn and ironed can by redrawing and ironing the shallow-drawn can; heating the entire drawn and ironed can; performing printing on an outer surface of a body section of the drawn and ironed can subjected to the heating; drying and baking of heating the entire printed can; performing neck and flange processing on the drawn and ironed can subjected to the drying and baking; and partially heating a portion to be a neck portion when a seamless can is formed until a temperature of the portion goes up to 185° C. to 230° C., between the forming a shallow-drawn can by drawing and the forming a drawn and ironed can by redrawing and ironing, and the heating the entire drawn and ironed can and the performing printing, or after the performing neck and flange processing.

In the method for manufacturing a seamless can of the present disclosure, it is preferable that (1) the partial heating be performed after the performing neck and flange processing, (2) the heating in the partial heating be high-frequency induction heating, and (3) a heating time by the high-frequency induction heating be less than 2 seconds.

In the outer-surface resin-coated seamless can of the first aspect of the present disclosure, a ratio Im/Iu in the above-described outer-surface polyester resin coating (which may be referred to as "outer-surface resin coating") is 1.0 or more. That is, even in a case of the seamless can being exposed to high-temperature high-humidity conditions after the contents are filled, as in a case of a sterilization treatment such as a retort sterilization treatment or a steaming treatment, the occurrence of whitening such as retort brushing of the outer-surface resin coating is suppressed, and even when the entire can is exposed to high-temperature conditions for the purpose of removing a lubricant during the can manufacturing and alleviating forming strain in the heating, the occurrence of whitening such as white streaks are suppressed, the occurrence of peeling of the outer-surface resin coating of a neck portion is also effectively suppressed, and thus heat-resistant water adhesion is excellent.

Furthermore, the above-described working effect can also be determined depending on the state of the inner-surface polyester resin coating (hereinafter, referred to as "inner-surface resin coating"). A state of the outer-surface resin coating can be determined to be good from the following criteria: a ratio Wm/Wu of the inner-surface polyester resin coating is 0.85 or less; the orientation index MOu of the polyester-resin-coated surface in the maximum reduced diameter portion is 2.40 or less; or the orientation index ratio MOm/MOu based on obtained by microscopic Raman spectroscopy is 2.10 or more.

That is, as described above, it is preferable to use a polyester resin having a large amount of PBT blended in order to suppress whitening of the outer-surface resin coating such as retort brushing or white streaks, but since the resin coating having a large amount of PBT and high crystallizability can produce an oriented crystal in a can axis direction, which is a rolling direction of the resin-coated metal sheet in the can manufacturing, and thus, the adhesion to the metal sheet tends to be deteriorated. In addition, when the amount of PBT blended increases, the amount of PET resin blended is relatively small, and particularly, the blended amount of the PET resin having a large content of isophthalic acid tends to decrease, which tends to deteriorate the adhesion of the metal sheet. On the other hand, since wrinkle impressions (scratches that occur during winding) are likely to occur on the neck portion, which is subjected to winding, when exposed to high-temperature high-humidity conditions such as a retort sterilization treatment and the like, it is conceivable that water vapor penetrates from this wrinkle impression, thereby causing peeling of the resin coating with poor adhesion (sometimes referred to as "neck portion delamination"). In addition, in the entire can of the seamless can, the neck portion is a region where a compressive strain of the resin film in the circumferential direction of the can increases due to drawing and ironing during the can manufacturing, and it is conceivable that adhesion between the resin film and the metal sheet tends to be weak.

In contrast, in the seamless can of the first aspect of the present disclosure, it is conceivable that the oriented crystal of the outer-surface resin coating of the neck portion is collapsed such that Im/Iu is within the range described above, thereby improving the adhesion of the outer-surface resin coating to the metal sheet, and the intrusion of water vapor is effectively suppressed even when the wrinkle impression is formed. On the other hand, the oriented crystallization of the outer-surface resin coating is maintained at portions other than the neck portion of the seamless can, and thus the barrier properties caused by the outer-surface resin coating are secured, which has excellent corrosion resistance, and the occurrence of whitening such as retort brushing or white streak is effectively suppressed.

On the other hand, even in the inner-surface resin-coated seamless can, a winding process is performed on the can body uppermost portion, or scratches may occur in the neck portion in the same manner as the outer-surface resin coating due to handling or foreign matters. If the sterilization treatment such as a retort sterilization treatment or a steaming treatment is applied in a state where such scratches are formed, in the inner-surface resin coating, which is affected by the internal pressure and contents, peeling of the inner-surface resin coating (sometimes, referred to as "scratch delamination") may occur in the same manner as the outer-surface resin coating. In addition, in comparison to other regions in the entire can, the neck portion tends to have a weak adhesion between the resin coating and the metal sheet, and the same applies to the inner-surface resin film. In particular, when the maximum reduced diameter portion having a diameter reduction rate of 15% or more with respect to the can body is present within a distance of 0% to 15% from the can body uppermost portion with respect to a total height of the seamless can from the can body uppermost portion to a can bottom, the scratch delamination is likely to occur in the inner-surface polyester resin coating.

In other words, even in the seamless can in which the polyester resin coating is formed on the inner surface of the outer-surface resin-coated seamless can, since the oriented crystals are collapsed so that the ratio Wm/Wu in the inner-surface resin coating is 0.85 or less, similarly to the outer-surface resin coating, the adhesion of the inner-surface resin coating to the metal sheet is improved, and even when the seamless can is subjected to a sterilization treatment or a steaming treatment after the contents are filled, the occurrence of peeling of the inner-surface resin coating of the neck portion is effectively suppressed, and the inner-surface resin coating has excellent heat-resistant water adhesion and excellent corrosion resistance.

Further, in the inner-surface resin-coated seamless can of the second aspect of the present disclosure, the melting point of the polyester resin constituting the inner-surface resin coating is 250° C. or more, the orientation index MOu is 3.60 or less, the ratio MOm/MOu of the orientation index MOm and the orientation index MOu is 1.80 or more in a state before the seamless can undergoes the sterilization treatment for suppressing spoilage of the contents, the orientation index MOu is 4.10 or less, and the MOm/MOu is 1.37 or more in a state after the seamless can undergoes the sterilization treatment for suppressing spoilage of the contents. In the inner-surface resin-coated seamless can of the third aspect of the present disclosure, the melting point of the polyester resin constituting the inner-surface resin coating is 220° C. or less, the MOm/MOu is 1.37 or more after the sterilization treatment, and the metal sheet is an aluminum sheet not subjected to a surface treatment and the orientation index MOu is 3.10 or less. These improve the adhesion of the inner-surface resin coating to the metal sheet. And thus, even when a diameter reduction rate of the maximum reduced diameter portion is large as 15% or more, or when the seamless can is subjected to the sterilization treatment or the steaming treatment after the contents are filled, the occurrence of peeling of the inner-surface resin coating of the neck portion is effectively suppressed, and the inner-surface resin coating has excellent heat-resistant water adhesion and excellent corrosion resistance.

In addition, according to the method for manufacturing a seamless can according to the present disclosure, it is possible to control the oriented crystal at a portion to be a neck portion of the seamless can by performing heating of a portion to be the neck portion of the seamless can at the specific timing described above. In addition, if the neck portion is heated under the high-temperature conditions, appearance defects with a plurality of fine irregularities locally occur only on an overlapping part of a finishing varnish of the seamless can; however, by performing such partial heating at a temperature in the range of 185° C. to 230° C., it is possible to form a seamless can excellent in heat-resistant water adhesion and the appearance properties without causing the appearance defects in the overlapping part of the finishing varnish of the seamless can.

DESCRIPTION OF EMBODIMENTS

Seamless Can

Figure 1:
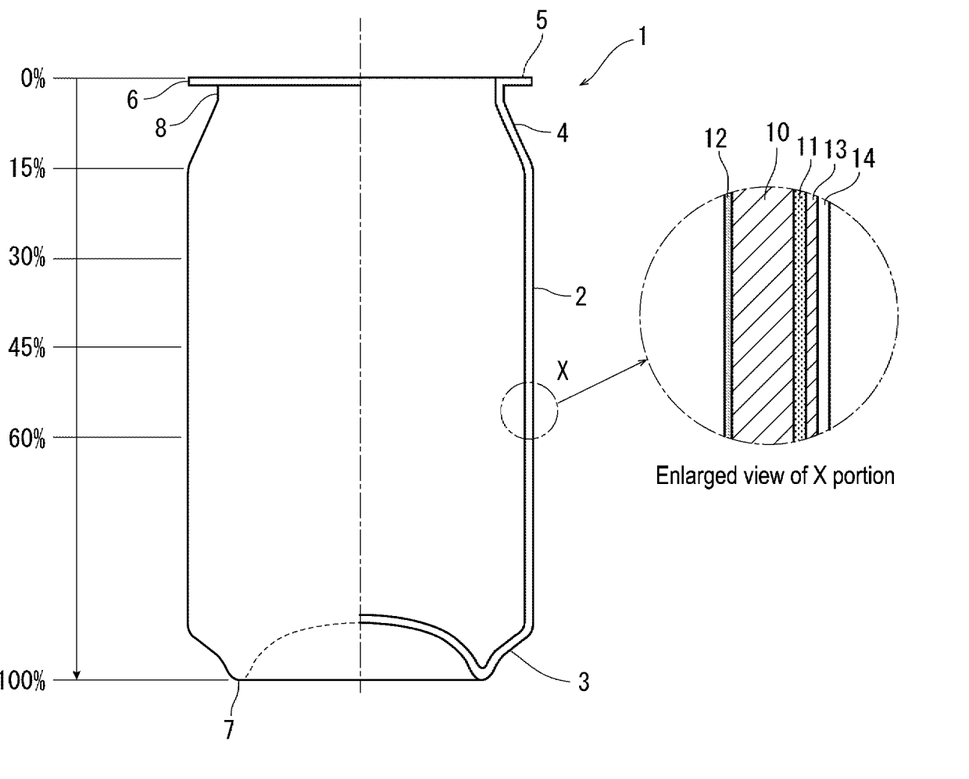
The FIGURE is a side view illustrating an example of a seamless can of the present disclosure, and a right half is a side sectional view.

The FIGURE is a diagram illustrating an example of a seamless can according to an embodiment of the present disclosure, in which a seamless can illustrated in its entirety as 1 includes a body section 2 having an outer surface in a straight body shape and a bottom section 3 closing a lower portion of the body section 2. An upper portion of the body section 2 is connected to a neck portion (also referred to as a "reduced diameter portion") 4 that has a diameter reduced by a neck processing (diameter reduction processing), and a flange portion 5 is formed on the upper end of the neck portion 4, via a maximum reduced diameter portion 8 that is a part having the largest proportion of the reduced diameter of the neck portion. Furthermore, in this seamless can, as is clear from a sectional view illustrating an enlarged X part of the seamless can body section, an outer-surface resin coating 11 is formed on an outer surface of a metal sheet 10 and an inner-surface resin coating 12 is formed on an outer surface of the metal sheet 10. A printed layer 13 and a finishing varnish layer 14 are formed on the outer-surface resin coating 11.

First Embodiment

A seamless can according to a first embodiment of the present disclosure, as illustrated in the FIGURE, includes a neck portion 4 obtained by neck processing in at least some range within a distance of 0% to 15% from a can body uppermost portion 6 with respect to a total height of the seamless can from the can body uppermost portion 6 (0%) of the seamless can to a can bottom portion 7 (100%). It is important that a ratio Im/Iu be 1.0 or more, and particularly preferably within a range of 1.0 to 4.5, where Iu is a value (cps/µm) calculated by dividing a maximum value of peak intensity in a range satisfying 15°≤2θ≤19° of an outer-surface resin coating based on an X-ray diffraction method at a measurement site in the maximum reduced diameter portion 8 of the neck portion by a thickness of the outer-surface resin coating at the measurement site, and Im is a value (cps/µm) calculated by dividing a maximum value of peak intensity in the range satisfying 15°≤2θ≤19° of outer-surface resin coating based on an X-ray diffraction method in the at least some range within a distance of 45% to 60% (hereinafter, a portion that is at least some range within this distance is sometimes referred to as the "can body center") from the can body uppermost portion 6 by a thickness of the outer-surface resin coating at the measurement site.

The range satisfying 15°≤2θ≤19° of the polyester resin coating based on the X-ray diffraction method has peaks related to the crystallinity of PET and PBT, for example, diffraction peaks such as plane index (0-11) and plane index (010). In the outer-surface resin-coated seamless can of the present disclosure, it is found that the maximum value Iu of the peak intensity of the outer-surface resin coating near the neck portion is smaller than the maximum value Im of the peak intensity near the center of the body section, and oriented crystals of the outer-surface resin coating of the neck portion are collapsed.

Furthermore, as described above, the oriented crystal state of the outer-surface resin coating can also be determined depending on the state of the inner-surface resin coating of the seamless can. That is, a ratio Wm/Wu is preferably 0.85 or less, and particularly preferably in a range of 0.59 to 0.70, where Wu ($cm^{-1}$) is a full width at half maximum (FWHM) of a peak near 1,730 $cm^{-1}$ based on microscopic Raman spectroscopy of an inner-surface polyester-resin-coated surface at the maximum reduced diameter portion 8 in the inner-surface polyester resin coating, and Wm ($cm^{-1}$) is a full width at half maximum (FWHM) of a peak near 1,730 $cm^{-1}$ based on the microscopic Raman spectroscopy of the polyester-resin-coated surface at a position within 45% to 60% of the distance from the can body uppermost portion.

In the analysis of the PET based on the microscopic Raman spectroscopy of the polyester resin coating, a Raman band assigned to C=O stretching vibration is expressed near 1,730 $cm^{-1}$, and PET has a resonance-stable planar structure when crystallized, and thus the width of the C=O band measured becomes narrower as the crystallization progresses, and the full width at half maximum becomes smaller as the oriented crystallization progress. In the seamless can according to the first embodiment of the present disclosure, it is clear that the full width at half maximum Wu of the inner-surface resin coating near the neck portion is larger than the full width at half maximum Wm near the center of the body section, and the oriented crystals of the inner-surface resin coating of the neck portion are collapsed.

Furthermore, in the seamless can according to the first embodiment of the present disclosure, MOu is preferably 2.40 or less, particularly preferably in a range of 1.00 to 2.00, and a ratio MOm/MOu is preferably 2.10 or more, particularly preferably in a range of 2.50 to 5.00, where MOu is an orientation index of the inner-surface polyester-resin-coated surface at the maximum reduced diameter portion 8 based on the microscopic Raman spectroscopy, and MOm is an orientation index based on the microscopic Raman spectroscopy of the polyester-resin-coated surface at a position within a distance of 45% to 60% from the can body uppermost portion.

In the analysis of PET in the microscopic Raman spectroscopy described above, a band at 1,615 $cm^{-1}$ is a peak attributed to C=C stretching mode, which has the highest correlation with orientation. On the other hand, a band at 632 $cm^{-1}$ can be used as an internal standard band because it is not affected by orientation. From this, the relative intensity $I_{1615}/I_{632}$ is calculated by dividing a maximum value $I_{1615}$ of the peak intensity at 1,615 $cm^{-1}$ by a peak top intensity $I_{632}$ at 632 $cm^{-1}$. A relative strength ratio Ix/Iy obtained by measuring the relative strength in a can height direction (Y) and in a direction (X) perpendicular to the can height direction respectively is set as the orientation index MO, which represents the orientation of PET including an amorphous portion.

It is clear that, since the orientation index MOu of the inner-surface resin coating in the neck portion is 2.40 or less, and the inner-surface resin coating in the neck portion is larger in the can height direction (Y) than in the can vertical direction (X), and since the ratio MOm/MOu of the orientation index MOm of the can body center to the orientation index MOu is 2.10 or more, the inner-surface resin coating of the neck portion is less oriented than the inner-surface resin coating of the can body center, and the orientation of the inner-surface resin coating of the neck portion is collapsed.

Therefore, similar to the seamless can of the second and third embodiments described below, the inner-surface resin coating of the seamless can of the first embodiment having such an oriented crystal state effectively suppresses the occurrence of peeling (scratch delamination) of the inner-surface resin coating of the neck portion even when subjected to a retort sterilization treatment or the like, and the inner-surface resin coating has excellent heat-resistant water adhesion and excellent corrosion resistance.

In the seamless can according to the first embodiment of the present disclosure, it is preferable that the diameter reduction rate of the maximum reduced diameter portion be 6% or less with respect to the diameter at the position 15% to 60% from the can body uppermost portion. It is possible to suitably maintain the state of the oriented crystals of the outer-surface resin coating in the neck portion by reducing the diameter equal to or less than the above value.

Second and Third Embodiments

In the seamless can according to a second embodiment of the present disclosure, it is important that the melting point of the polyester resin constituting the inner-surface resin coating is 250° C. or more, and in a state before the seamless can undergoes the sterilization treatment for suppressing spoilage of the contents, the orientation index MOu by the microscopic Raman spectroscopy of the inner-surface polyester-resin-coated surface at the maximum reduced diameter portion is 3.60 or less.

In addition, in the second embodiment, it is preferable that: the inner-surface resin coating have a ratio MOm/MOu of 1.80 or more, particularly in a range of 1.90 to 4.50, where MOm is an orientation index based on the microscopic Raman spectroscopy of the polyester-resin-coated surface at a position within a distance of 45% to 60% from the can body uppermost portion, and MOu is the orientation index; in a state after the seamless can undergoes the sterilization treatment for suppressing spoilage of the contents (hereinafter, sometimes referred to as "after sterilization treatment"), the orientation index MOu be 4.10 or less particularly in a range of 1.00 to 4.00, and the ratio MOm/MOu be 1.37 or more, particularly in a range of 1.40 to 5.00.

In the seamless can according to a third embodiment of the present disclosure, it is important that the melting point of the polyester resin constituting the inner-surface resin coating be 220° C. or less, and the ratio MOm/MOu after the sterilization treatment be 1.37 or more, particularly in a range of 1.40 to 2.00. In the third embodiment, when a multi-layer structure is adopted as the inner-surface polyester resin coating, the melting point of the resin constituting the lower layer on the metal sheet side may be 220° C. or less.

In this embodiment, the inner-surface resin coating preferably has the orientation index MOu of 3.10 or less, particularly preferably in a range of 1.40 to 2.00.

In the present specification, "a state before the seamless can undergoes the sterilization treatment for suppressing spoilage of the contents" means a state of an empty can after the seamless can is manufactured by the above-described manufacturing method of the present disclosure until the content is filled, and "a state after the seamless can undergoes the sterilization treatment for suppressing spoilage of the contents" means a state of a can filled with contents subjected to a known sterilization treatment in the related art such as retort sterilization treatment or pasteurization performed after the contents are filled.

In the seamless can of the second and third embodiments of the present disclosure, the inner-surface resin coating has the feature described above, and thus the adhesion to the metal sheet is significantly improved. Therefore, even in the case of having a maximum reduced diameter portion in which the diameter reduction rate is as large as 15% or more, particularly 20% or more, or in the case of using a metal sheet not subjected to a surface treatment, when the plate is subjected to a sterilization treatment, a steaming treatment or the like performed for suppressing spoilage of the contents after the contents are filled, the occurrence of peeling (scratch delamination) of the inner-surface resin coating of the neck portion is effectively suppressed, and the inner-surface resin coating has excellent heat-resistant water adhesion and excellent corrosion resistance.

Metal Sheet

In an embodiment of the present disclosure, for the metal sheet, a surface-treated steel sheet of various types or a light metal sheet of aluminum or the like that have been used in forming seamless cans in the related art can be used.

The surface-treated steel sheet that can be used includes one that is obtained by annealing a cold rolled steel sheet, then subjecting such a sheet to temper rolling or secondary cold rolling, and then to one, or two or more types of surface treatments, such as zinc plating, tin plating, nickel plating, electrolytic chromate treatment, chromate treatment, or zirconium compound treatment.

For the light metal sheet, in addition to what is called an aluminum sheet, an aluminum alloy sheet is used. Specifically, aluminum alloy plates of 3000 series, 5000 series, and 6000 series in "JIS H 4000" can be suitably used. It is desirable that these light metal sheets are subjected to an inorganic surface treatment such as a chromate phosphate treatment, a zirconium phosphate treatment or a zirconium treatment, but since the polyester resin coating in the present disclosure is excellent in adhesion to the metal sheet, untreated aluminum sheets not subjected to the surface treatment as described above can also be suitably used.

The original sheet thickness of the metal sheet varies with the type of metal, the application or size of the container, but typically the metal sheet preferably has a thickness of 0.10 to 0.50 mm. Of the metal sheets, for the surface-treated steel sheet, the thickness is preferably from 0.10 to 0.30 mm from the viewpoints of strength of the seamless can to be obtained and formability, and for the light metal sheet, the sheet preferably has a thickness of 0.15 to 0.40 mm.

Polyester Outer-Surface Resin Coating

In the seamless can according to the first embodiment of the present disclosure, from the viewpoint of suppressing the occurrence of retort brushing and white streaks, the polyester resin constituting the outer-surface resin coating is preferably a copolymer resin including 20 to 60 mass %, particularly 45 to 55 mass %, of a polybutylene terephthalate homopolymer resin or a copolymer resin mainly containing a butylene terephthalate unit (hereinafter, these may be collectively referred to as "PBT"), the remainder of the copolymer resin being a polyethylene terephthalate homopolymer (PET) or a copolymer resin mainly containing an ethylene terephthalate unit (for example, in a case of PET containing 5 mol % isophthalic acid, may be described as "PETIA5"). When the content of PBT is smaller than the above range, whitening such as retort brushing and white streaks may occur at the can bottom portion, and the appearance properties may be deteriorated. On the other hand, when the amount of PBT is larger than the above range, as described above, the adhesion of the outer-surface resin coating is deteriorated, and there is a possibility that the outer-surface resin coating of the neck portion is peeled off by the retort sterilization treatment or the like. In addition, the resin coating may be scraped off during the drawing and ironing to cause metal exposure, and the appearance properties after printing may be deteriorated.

The PBT copolymer resin or the PET copolymer resin preferably contains a butylene terephthalate unit or an ethylene terephthalate unit in an amount of 50 mol % or more, particularly 80 mol % or more.

Examples of the carboxylic acid component other than the terephthalic acid component as the copolymerization component include, but are not limited to, isophthalic acid, naphthalenedicarboxylic acid, p-β-oxyethoxybenzoic acid, biphenyl-4,4'-dicarboxylic acid, diphenoxyethane-4,4'-dicarboxylic acid, 5-sodium sulfoisophthalic acid, hexahydroterephthalic acid, adipic acid, sebacic acid, trimellitic acid, pyromellitic acid, hemimellitic acid, 1,1,2,2-ethanetetracarboxylic acid, 1,1,2-ethanetricarboxylic acid, 1,3,5-pentanetricarboxylic acid, 1,2,3,4-cyclopentanetetracarboxylic acid, biphenyl-3,4,3',4'-tetracarboxylic acid, and dimer acid.

On the other hand, examples of the alcohol component other than 1,4-butanediol or ethylene glycol include, but are not limited to, propylene glycol, neopentyl glycol, 1,6- hexylene glycol, diethylene glycol, triethylene glycol, cyclohexanedimethanol, bisphenol A ethylene oxide adduct, glycerol, trimethylolpropane, pentaerythritol, dipentaerythritol, and sorbitan.

The outer-surface resin coating is not limited thereto, but the content of isophthalic acid (IA) in the polyethylene terephthalate resin is preferably 2 to 15 mol %, and particularly preferably 5 to 13 mol %. In addition, the polyester resin film preferably includes a blend prepared by blending polyethylene terephthalate (PET) and polybutylene terephthalate (PBT) in a mass ratio of PET:PBT=80:20 to 40:60.

In the second and third seamless cans of the present disclosure, the same polyester resin as in the first embodiment can be used as the outer-surface resin coating, but when the diameter reduction rate of the maximum reduced diameter portion is 15% or more, it is preferable to use a polyester resin containing an ethylene terephthalate unit in an amount of 80 mol % or more. As copolymerization components other than ethylene glycol and terephthalic acid, the above-described copolymerization components can be used.

In the seamless can according to the second and third embodiments, preferably, it is desirable to provide an outer-surface resin coating similar to the inner-surface resin coating as in examples described later.

The intrinsic viscosity (IV) of the polyester resin measured using a phenol/tetrachloroethane mixed solvent as a solvent is preferably in a range of 0.5 to 1.4 dL/g, and particularly preferably in a range of 0.65 to 1.4 dL/g. If the intrinsic viscosity is larger than the above range, the melt viscosity when the resin is heated and melted becomes extremely high, and it becomes difficult to coat the metal sheet with the resin, which is not preferable. In addition, if the intrinsic viscosity is smaller than the above range, it cannot withstand severe processing such as drawing and ironing, and the flavor property and corrosion resistance are deteriorated, which is not preferable.

The glass transition temperature (Tg) of the polyester resin is preferably in a range of 30° C. to 80° C., and particularly preferably in a range of 50° C. to 65° C. In particular, when Tg is higher than the above range, processability may be deteriorated. On the other hand, when Tg is lower than the above range, retort whitening resistance and the like may be deteriorated.

Further, the melting point (Tm) of the polyester resin is preferably in a range of 200° C. to 260° C., and particularly preferably in a range of 215° C. to 235° C. When the melting point is lower than the above range, retort whitening resistance and the like may be deteriorated.

Furthermore, in the polyester resin, known additives for resins per se, for example, an anti-blocking agent such as amorphous silica, a pigment such as titanium dioxide, an antistatic agent, an antioxidant, a lubricant, and the like can be blended by known formulations.

The thickness of the outer-surface resin coating is not limited thereto, but is preferably in a range of 5 to 20 μm. In addition, the outer-surface resin coating may be a single layer as illustrated in the FIGURE, but may be a multilayer of two or more layers. In the case of a multilayer, it is important that at least all layers other than the lowermost layer be coated with the outer-surface resin coating containing the PBT described above. In the case of a multilayer, the total thickness is desirably in the above range.

Polyester Inner-Surface Resin Coating

In the seamless can of the present disclosure, as the inner-surface resin coating, a polyester resin similar to the outer-surface resin coating can be used, but from the viewpoint of processing adhesion, corrosion resistance, and the like of the resin coating in the drawing and ironing, a copolymer resin mainly containing an ethylene terephthalate unit is preferable.

In particular, a polyethylene terephthalate homopolymer resin (homo-PET) or a copolymer resin mainly containing an ethylene terephthalate unit (copolymerized PET) is preferable, and copolymerized PET containing 1 to 15 mol % of isophthalic acid can be suitably used.

Even in the inner-surface resin coating, similarly to the outer surface resin coating, the melting point (Tm) of the polyester resin is preferably in a range of 200° C. to 260° C., and particularly preferably in a range of 215° C. to 235° C. When the melting point is lower than the above range, retort whitening resistance may be deteriorated.

Incidentally, in the seamless can according to the second embodiment, a polyester resin having a melting point (Tm) of 250° C. or more is used as the inner-surface resin coating, and as a result, it is possible to develop container performance that is inexpensive and excellent in the flavor property.

Also, in the inner-surface resin coating, a known additive for resin in the related art, which has an intrinsic viscosity and a glass transition temperature within the same ranges as those of the outer-surface resin coating can be used.

The thickness of the inner-surface resin coating is not limited thereto, but is preferably in a range of 10 to 30 μm.

The inner-surface resin coating may be either a single layer or a multilayer, but it is particularly desirable that PETIA containing 9 to 15 mol % of an isophthalic acid is used for a lower layer, and PETIA or homo-PET having 9 mol % or less of an isophthalic acid, which is not more than that of the lower layer, is used for the surface layer. The thickness ratio between the lower layer and the surface layer is not limited thereto, and is preferably in a range of 8:2 to 4:6.

Polyester-Resin-Coated Metal Sheet

The polyester-resin-coated metal sheet used in manufacturing the resin-coated seamless can of the present disclosure can be manufactured by coating a metal sheet with a polyester resin coating using the polyester resin described above, and using a known method such as an extrusion lamination method, a thermal fusion method, a dry lamination, and the like. From the viewpoint of processability and the like, it is preferable to be laminated by an extrusion lamination method, but it is also possible to laminate a biaxially stretched polyester film excellent in corrosion resistance by a heat fusion method or dry lamination.

The resin coating formed of a polyester resin is preferably formed on both the inner surface and the outer surface, and the polyester resin coating may be formed on only one of the inner surface and the outer surface, and the other may be a coating film formed of a known coating material composition in the related art.

In order to further improve the adhesion of the polyester resin coating to the metal sheet, an adhesive primer can also be used.

As a primer coating material excellent in the adhesion and corrosion resistance, known primers in the related art such as an epoxy phenol-based primer coating material and a polyester phenol-based primer coating material can be used, and it is preferable to use a polyester phenol-based primer coating material containing a polyester resin and a resol type phenol resin derived from m-cresol as a curing agent from the viewpoint of hygiene.

Method for Manufacturing Seamless Can

The seamless can of the present disclosure is formed by a known forming method in the related art, such as forming a shallow-drawn can by drawing using a polyester-resin-coated metal sheet in which a polyester resin coating is formed on an inner surface and/or an outer surface, and forming a drawn and ironed can by redrawing and ironing the shallow-drawn can, and formed by going through heating the entire drawn and ironed can, performing printing on an outer surface of a body section of the drawn and ironed can subjected to the heating, drying and baking of heating the entire printed can, and performing neck and flange processing on the drawn and ironed can subjected to the drying and baking. However, as described above, in the present disclosure, it is important that the method include partially heating a portion to be a neck portion when a seamless can is formed so that temperature of the portion goes up to 185° C. to 230° C., particularly 190° C. to 210° C., at any timing between (a) the drawing and the redrawing ironing, and (b) the heating of the entire drawn and ironed can and the printing, or after (c) the neck and flange processing.

As a result, it is possible to adjust Im/Iu, Wm/Wu, MOm/MOu and the like to fall within the above-described range by lowering the orientated crystallization of the polyester resin coating at the portion to be the neck portion without lowering the orientated crystallization of the polyester resin coating at a portion other than the neck portion. And thus, even when the can is exposed to a high-temperature high-humidity conditions such as a retort sterilization treatment, the occurrence of whitening such as retort brushing is suppressed. And even when the entire can is exposed to high-temperature conditions during the heating for the purpose of removing a lubricant and alleviating forming strain in the can manufacturing, the occurrence of whitening such as white streaks and the like can be suppressed. Also, the occurrence of peeling of the resin coating of the neck portion can be also effectively suppressed.

Drawing/Redrawing Ironing

The drawing and the redrawing ironing can be performed by known methods in the related art.

In the drawing, the shallow-drawn can which is formed by drawing so that a drawing ratio (=blank diameter/punch diameter) becomes 1.4 to 1.8 using a drawing punch and a die is then subjected to the redrawing ironing. However, in the present disclosure, as described above, before being subjected to the redrawing ironing, a portion of 0% to 25% from the can body uppermost portion with respect to the can height of the shallow-drawn can, which is a portion to be the neck portion of the seamless can of the shallow-drawn can, may be partially heated (the timing (a): heating method will be described later).

In the subsequent redrawing ironing, the redrawing can be omitted depending on the drawing ratio of the shallow-drawn can, and the ironing may be directly performed. Furthermore, a bending-expansion process (stretch processing) due to redrawing may be performed. Preferably, the sidewall is thinned by redrawing and ironing. The thinning is preferably performed so that the thickness of the resultant sidewall becomes 30% to 65%, particularly 34% to 42%, of a base plate thickness of the resin-coated metal sheet.

Heating

The seamless can obtained by drawing and redrawing ironing is subjected to a heat treatment in order to remove the lubricant used at the time of forming and to alleviate the forming strain of the polyester resin coating after the can body uppermost portion is trimmed. This heat treatment is generally performed in a temperature range of melting point (Tm)−5° C. or more, particularly Tm−5 to Tm+20° C., based on Tm of the resin coating. The heating time varies depending on the heating method and cannot be unconditionally defined, but is generally preferably in a range of 30 to 60 seconds.

As a heating method, for example, a known heating devices such as a hot air circulating furnace, an infrared heating furnace, a high-frequency induction heating device, or a dielectric heating device can be used.

The seamless can cooled after the heating is then subjected to the printing. However, in the present disclosure, as described above, before being subjected to the printing, a portion to be the neck portion of the heat-treated seamless can (in a range of 0% to 15% from the can body uppermost portion with respect to the height of the heated seamless can) may be partially heated (the timing (b): heating method will be described later).

Printing and Neck and Flange Processing

The seamless can subjected to the heat treatment is subsequently printed on the can body section by a known printing method in the related art such as gravure printing, offset printing, flexographic printing, or inkjet printing, and then baked and dried to form a printed layer. Furthermore, a finishing varnish layer is formed on the printed layer in order to suppress scratches on a print image. It is preferable that the printed layer be formed not only at the center of the can body section but also at a portion to be neck-processed from the viewpoint of design property.

In the seamless can in which the printed layer and the finishing varnish layer are formed, the diameter of the neck portion is then reduced by neck processing (diameter reduction processing), and a flange portion is formed by flange processing to complete the seamless can.

The diameter reduction rate by the neck processing is generally in a range of 5% to 25%, and is preferably 6% or less in the seamless can of the first embodiment having the outer-surface resin coating described above, and can be 15% or more in the second and third seamless cans having the inner-surface resin coating described above. The diameter reduction rate in the present specification is calculated from the following formula.

$$\text{Diameter reduction rate (\%)} = (D_0 - D_1)/D_0 \times 100$$

where Do is an inner diameter of the can body within a range of 15% to 60% from the can body uppermost portion, and $D_1$ is an inner diameter of the can body at the maximum reduced diameter portion.

In the present disclosure, as described above, a portion in a range of 0% to 15% from the can body uppermost portion with respect to the height of the seamless can is heated to obtain a finished product (the timing (c): heating method will be described later). At least a portion of the region to be neck-processed includes a printed layer and a finishing varnish layer, and particularly when the scratches are generated immediately below the winding of the outer surface of the can on which the pigment is printed, peeling is likely to occur with the scratches as a starting point during the retort sterilization treatment.

Partial Heating

As described above, in the present disclosure, the value of Im/Iu of the outer-surface resin coating and Wm/Wu, MOu, MOm/MOu of the inner-surface resin coating can be adjusted to the above-described values by partially heating the portion to be the neck portion when the seamless can is formed so that a temperature of the portion goes up to 185° C. to 230° C., particularly 190° C. to 210° C. at any timing of (a) to (c) described above.

The partial heating may be performed at any timing of the above (a) to (c), but it is preferable to perform the partial heating particularly at the timing (c) performed in the seamless can after the neck and flange processing since the oriented crystallization can be efficiently controlled by directly heating the neck portion, which is a portion to be improved in adhesion with the metal sheet, in a state of a finished product.

The heating time cannot be unconditionally defined by the heating temperature and the heating method, but is desirably in a range of 0.05 to 40 seconds, and particularly in a case of high-frequency induction heating, heating is preferably performed in a range of less than 2.0 seconds, particularly 0.1 to 0.6 seconds.

The method of heating is not limited as long as the above temperature conditions are satisfied, but heating by high-frequency induction heating is particularly preferable. Advantages of the high-frequency induction heating over other heating methods such as an oven are as follows: the adhesion force between the resin coating and the metal sheet can be efficiently improved due to the interface between the metal sheet and the resin coating being heated through the interface heated from the metal sheet; a space required for installation of equipment is small; the high temperature can be reached in a short time; and only a specific site can be heated.

When the partial heating is performed by high-frequency induction heating in the present disclosure, only a portion to be the neck portion of the seamless can is selectively heated, the temperature is an attainment temperature of the interface between the metal sheet and the film, and a time until the attainment temperature is reached is defined as a heating time. In addition, in the case of oven heating, the temperature is the maximum temperature reached in the oven, and the holding time of the maximum reaching temperature is defined as the heating time.

The high-frequency induction heating uses, but is not limited to, a high frequency of 10 to 200 KHz. For the high-frequency induction heating, a heating device including a known high-frequency induction heating coil can be used. This heating device generally includes a high-frequency induction heating coil, an electrode for connecting the coil and a power supply, a magnetic member for enhancing electromagnetic coupling between the coil and the seamless can and regulating a heating part of the seamless can, and a cooling mechanism for cooling the coil.

In the seamless can of the present disclosure completed in this manner, as described above, even when being exposed to high-temperature high-humidity conditions such as a retort sterilization treatment, the occurrence of whitening such as retort brushing is suppressed, and even when the entire can is exposed to high-temperature conditions during heating for the purpose of removing a lubricant and alleviating forming strain in the can manufacturing process, the occurrence of whitening such as white streaks are suppressed, and the occurrence of peeling of the resin coating of the neck portion is also effectively suppressed.

EXAMPLES

The present disclosure is more specifically described through examples, but the present disclosure is not limited by these examples.

Examples 1 to 12, Comparative Examples 1 to 5

An aluminum sheet (material number: A 3104) having a plate thickness of 0.26 mm, a 10 μm-thick film, and a 12 μm-thick two-layer film were prepared. The 10 μm-thick film was made of a polyester resin (glass transition temperature 56° C., melting point I: 218° C., melting point II: 232° C.) obtained by blending a polybutylene terephthalate resin (PBT) and a polyethylene terephthalate resin (PE-TIA11) copolymerized with 11 mol of isophthalic acid at a mass ratio of 60:40 and was used as an outer-surface resin coating. The 12 μm-thick two-layer film (surface layer: glass transition temperature 79° C., melting point 247° C., lower layer: glass transition temperature 75° C., melting point 215° C.) was made of a polyethylene terephthalate resin containing isophthalic acid (IA) and was used as an inner-surface resin coating. The aluminum sheet was heated to 250° C., and then, the 10 μm-thick film and the 12 μm-thick two-layer film were thermally pressed on the heated aluminum sheet with lamination rolls to obtain an aluminum sheet coated with a resin on the inner and outer surfaces.

The obtained resin-coated aluminum sheet was punched into a circular blank having a diameter of 126.5 mm by a drawing machine to form a shallow drawing cup having a body wall with an average height of 38 mm (drawing). Next, the shallow drawing cup was subjected to ironing (redrawing ironing), and the obtained drawn and ironed can was heated in an oven at a set temperature of 190° C. to 210° C. for 30 to 60 seconds (heating). Next, a can body section printed layer and a finishing varnish layer were formed (printing). Thereafter, diameter reduction (diameter reduction amount: 5.9%) was performed from a can body diameter of 54.0 mm to a diameter of 50.8 mm to form a neck portion, and then a flange portion was formed (neck and flange processing) to prepare a seamless can having a can height of 133.215 mm.

The partial heating was performed at any timing between the drawing and the redrawing ironing (indicated by "a" in Table 1), between the heating and the printing (indicated by "b" in Table 1), or after the neck and flange processing (indicated by "c" in Table 1). The heating was performed for 0.30 seconds with a high-frequency induction heating device under the temperature conditions shown in Table 1.

Examples 13 to 15, Comparative Examples 6 and 7

An aluminum sheet (material number: A 3104) having a plate thickness of 0.27 mm and a film made of a polyethylene terephthalate resin (glass transition temperature: 80° C., melting point: 254° C.) and having a thickness of 12 μm were prepared. The aluminum sheet was heated to 290° C., and then the film was thermally pressed on the side to be the inner surface and the outer surface of the heated aluminum sheet with lamination rolls to obtain an aluminum sheet coated with a resin on the inner and outer surfaces.

The obtained resin-coated aluminum sheet was punched into a circular blank having a diameter of 142.0 mm by a drawing machine to form a shallow drawing cup having a body wall with an average height of 33.5 mm (drawing). Next, the shallow drawing cup was subjected to ironing (redrawing ironing), and the obtained drawn and ironed can was heated in an oven at a set temperature of 190° C. to 210° C. for 30 to 60 seconds (heating). Next, a can body section printed layer and a finishing varnish layer were formed (printing). Thereafter, diameter reduction (diameter reduction rate: 20.9%) was performed from a can body diameter of 68.3 mm to a diameter of 54.0 mm to form a neck portion, and then a flange portion was formed (neck and flange processing) to prepare a seamless can having a can height of 122.2 mm.

The partial heating was performed after the neck and flange processing (indicated by "c" in Table 4), and high-frequency induction heating was performed in the same manner as in Example 1 under the temperature conditions shown in Table 4.

Examples 16 to 19, Comparative Examples 8 and 9

An aluminum sheet (material number: A 3104) having a plate thickness of 0.27 mm, and a 12 μm-thick two-layer film (surface layer: glass transition temperature 79° C., melting point 247° C., lower layer: glass transition temperature 75° C., melting point 215° C.) made of a polyethylene terephthalate resin containing isophthalic acid (IA) were prepared. The aluminum sheet was heated to 250° C., and then the 12 μm-thick two-layer film was thermally pressed on the side to be the inner surface and the outer surface of the heated aluminum sheet with lamination rolls to obtain an aluminum sheet coated with a resin on the inner and outer surfaces.

The obtained inner-surface resin-coated aluminum sheet was punched into a circular blank having a diameter of 142.0 mm by a drawing machine to form a shallow drawing cup having a body wall with an average height of 33.5 mm (drawing). Next, the drawing cup was subjected to ironing (redrawing ironing), and the obtained drawn and ironed can was heated in an oven at a set temperature of 190° C. to 210° C. for 30 to 60 seconds (heating). Next, a can body section printed layer and a finishing varnish layer were formed (printing). Thereafter, diameter reduction (diameter reduction rate: 20.9%) was performed from a can body diameter of 68.3 mm to a diameter of 54.0 mm to form a neck portion, and then a flange portion was formed (neck and flange processing) to prepare a seamless can having a can height of 122.2 mm.

The partial heating was performed after the neck and flange processing (indicated by "c" in Table 5), and high-frequency induction heating was performed in the same manner as in Example 1 under the temperature conditions shown in Table 5.

Preparation of Sample

In each of the seamless cans obtained in Examples 1 to 19 and Comparative Examples 1 to 9, a couple of samples of about 4 mm×20 mm were cut out with a short side as a height direction of the can so that the center of one of the couple came to a position of about 53% (can body center) from the maximum reduced diameter portion and the center of the other of the couple came to the can body uppermost portion. Each sample was cut out such that the 0° rolling direction of the plate came to the center on a long side of the sample.

Maximum Value of Peak Intensity in Range Satisfying 15°≤2θ≤19° Determined by X-Ray Diffraction Method Using a fully automatic multi-purpose horizontal X-ray diffractometer, the samples of Examples 1 to 12 and Comparative Examples 1 to 5 cut out by the above-described method were horizontally set on a stage, and the measurement was performed with the short side facing the X-ray source and the detector side and the long side facing the can upper side with respect to the can height direction toward the inside of the apparatus. The vicinity of the center of the sample was measured with the outer-surface resin coating on the upper side while the aluminum sheet remained in the sample. The measurement conditions are as described below.

Apparatus: Full automatic multipurpose horizontal X-ray diffractometer SmartLab manufactured by Rigaku Corporation Tube: Target Cu, Output 9 kW
Tube voltage: 40 kV
Tube current: 20 mA
Scan axis: 2θ/θ
Scanning range: 15° to 30°
Step: 0.02 deg For the outer-surface resin coating, the X-ray diffraction spectrum was measured by scanning the range of the X-ray diffraction angle 2θ=15° to 30° of the polyester resin using a reflection method while an incident angle and a reflection angle of the X-ray were each θ with respect to the diffraction angle 2θ and the incident angle and the reflection angle were constantly kept equal in a range satisfying 15°≤2θ≤19°. In the measurement, the sample was fixed on a stage using tweezers or the like because the analysis may not be correctly performed if an oil component was attached to the sample.

The peak intensity at 2θ=15° and the peak intensity at 2θ=30° were connected by a straight line to obtain a background, and the background was drawn to obtain a maximum value of the peak intensity in the range satisfying 15°≤2θ≤19° of the outer-surface resin coating at the neck portion by an X-ray diffraction method, and a value Iu (cps/μm) was calculated by dividing the maximum value by the thickness of the outer-surface resin coating at the measurement site. Similarly, the background was drawn to obtain a maximum value of the peak intensity in the range satisfying 15°≤2θ≤19° of the outer-surface resin coating at the can body center by an X-ray diffraction method, and a value Im (cps/μm) was calculated by dividing the maximum value by the thickness of the outer-surface resin coating at the measurement site. From these results, the ratio Im/Iu was calculated. The measurement was performed before and after retort sterilization treatment at 125° C. for 30 minutes. The results are shown in Tables 1 and 2.

Measurement of Inner-Surface Resin Coating by Microscopic Raman Spectroscopy

The cut-out samples of Examples 4, 9, and 12 to 19 and Comparative Examples 1, 4, and 6 to 9 were horizontally set on a stage by the above-described method, and the vicinity of the center of the sample was measured with the inner-surface resin film on the upper side while aluminum remained in the sample.

A. Measurement of Full Width at Half Maximum

The apparatus used and measurement conditions are as follows.

Apparatus: DXR 2xi imaging microscopic Raman available from Thermo Fisher Scientific
Laser, spectrometer: wavelength 532 nm, 5 mW non-polarized, full range grating
Aperture: 25 μm confocal pinhole
Analyzer: none
Objective lens: ×100
Measurement position: sample surface (place within 2 μm in depth direction from outermost surface focus position is measured)

The full width at half maximum W of the peak near 1,730 cm$^{-1}$ was determined under the above conditions. In addition, in determining full width at half maximum (FWHM) and peak intensity, the peak intensity subtracted from the background was utilized. The measurement was performed before and after retort sterilization treatment at 125° C. for 30 minutes. The results are shown in Tables 3 to 5.

B. Measurement of Orientation Index MO

The same procedure as in A was carried out, except that a ratio $I_{1615}/I_{632}$ of the peak top intensity near 1615 cm$^{-1}$ to the peak top intensity near 632 cm$^{-1}$ was determined in each of the case where the laser polarization and the analyzer were aligned in the height direction of the sample and the case where the laser polarization and the analyzer were aligned in the vertical direction of the sample, and the ratio $(I_{1615}/I_{632})$ yy/$(I_{1615}/I_{632})$ xx in the height direction to the vertical direction was taken as the orientation index MO. The results are shown in Tables 3 to 5.

Evaluation of Delamination of Neck Portion of Outer-Surface Resin Coating

Each seamless can obtained in Examples 1 to 12 and Comparative Examples 1 to 5 was filled with water, a lid was then wound, and a retort sterilization treatment was performed under conditions of a sterilization temperature of 130° C. and a sterilization time of 30 minutes.

For the seamless can after the retort sterilization treatment, regardless of the magnitude of peeling, when floating of the film occurred immediately below the winding portion, it was evaluated that there was peeling, and for 90 cans, the number of cans in which peeling occurred was examined. The evaluation criteria are as follows. The results are shown in Table 1 (the numerical value in ( ) in the table is the number of generated cans).

Excellent: the number of peeled cans was 0
Good: the number of peeled cans was from 1 to 3
Poor: the number of peeled cans was 4 or more Evaluation of Scratch Delamination of Neck Portion of Inner-Surface Resin Coating In the inner-surface resin coating of the neck portion of each seamless can obtained in Examples 4, 9, and 12 to 19 and Comparative Examples 1, 4, and 6 to 9, a cut for one round was made with a cutter in the circumferential direction, and then a retort sterilization treatment was performed under the conditions of a sterilization temperature of 125° C. and a sterilization time of 30 minutes. The evaluation criteria are as follows. The results are shown in Tables 3 to 5.

Good: the number of cans with film floating out of 10 cans was 0.
Poor: the number of cans with film floating out of 10 cans was 1 or more.

Appearance Evaluation of Finishing Varnish Overlapping Portion

The appearance of the overlapping portion of the finishing varnish of each seamless can obtained in Examples 1 to 12 and Comparative Examples 1 to 5 was visually observed. The evaluation criteria are as follows. The results are shown in Table 1.

Good: no abnormality
Poor: appearance defects occur

Comprehensive Evaluation

The criteria for the comprehensive evaluation in Table 1 are as follows.

Good: both appearance evaluation of overlapping portion and delamination evaluation of neck portion of resin coating after retorting are good.
Poor: At least one of appearance evaluation of overlapping portion or delamination evaluation of neck portion of resin coating after retorting is poor.

TABLE 1

| | Outer-surface resin | | | | | |
|---|---|---|---|---|---|---|
| | Diameter reduction rate % | Resins | Melting point ° C. | Surface treatment | Partial heating temperature ° C. | Timing of partial heating |
| Example 1 | 5.9 | PBT-containing PETIA | 218 | Chromate phosphate | 190 | b |
| Example 2 | 5.9 | | 218 | Chromate phosphate | 190 | c |
| Example 3 | 5.9 | | 218 | Chromate phosphate | 195 | b |
| Example 4 | 5.9 | | 218 | Chromate phosphate | 195 | c |
| Example 5 | 5.9 | | 218 | Chromate phosphate | 200 | b |
| Example 6 | 5.9 | | 218 | Chromate phosphate | 200 | c |
| Example 7 | 5.9 | | 218 | Chromate phosphate | 210 | a |
| Example 8 | 5.9 | | 218 | Chromate phosphate | 210 | b |
| Example 9 | 5.9 | | 218 | Chromate phosphate | 210 | c |
| Example 10 | 5.9 | | 218 | Chromate phosphate | 230 | a |
| Example 11 | 5.9 | | 218 | Chromate phosphate | 230 | b |
| Example 12 | 5.9 | | 218 | Chromate phosphate | 230 | c |
| Comparative Example 1 | 5.9 | PBT-containing PETIA | 218 | Chromate phosphate | No heating | — |
| Comparative Example 2 | 5.9 | | 218 | Chromate phosphate | 180 | a |
| Comparative Example 3 | 5.9 | | 218 | Chromate phosphate | 180 | b |
| Comparative Example 4 | 5.9 | | 218 | Chromate phosphate | 180 | c |
| Comparative Example 5 | 5.9 | | 218 | Chromate phosphate | 235 | c |

| | Outer surface of manufactured can Maximum peak intensity in range satisfying $15° \leq 2\Theta \leq 19°$ | | | Appearance evaluation of varnish overlapping portion | Evaluation of delamination of outer-surface neck portion after retort | Comprehensive evaluation |
|---|---|---|---|---|---|---|
| | Iu cps/μm | Im cps/μm | Im/Iu | | | |
| Example 1 | 13.6 | 28.3 | 2.1 | Good | Good (2) | Good |
| Example 2 | 5.3 | 22.1 | 4.2 | Good | Excellent (0) | Good |
| Example 3 | 11.9 | 31.4 | 2.6 | Good | Good (1) | Good |
| Example 4 | 6.4 | 27.0 | 4.2 | Good | Excellent (0) | Good |
| Example 5 | 13.2 | 32.5 | 2.5 | Good | Excellent (0) | Good |
| Example 6 | 6.3 | 22.4 | 3.6 | Good | Excellent (0) | Good |
| Example 7 | 16.0 | 35.1 | 2.2 | Good | Good (2) | Good |

TABLE 1-continued

| | | | | | | |
|---|---|---|---|---|---|---|
| Example 8 | 5.1 | 17.9 | 3.5 | Good | Good (1) | Good |
| Example 9 | 7.1 | 21.8 | 3.1 | Good | Excellent (0) | Good |
| Example 10 | 17.4 | 36.8 | 2.1 | Good | Good (3) | Good |
| Example 11 | 13.0 | 34.4 | 2.6 | Good | Good (1) | Good |
| Example 12 | 6.5 | 18.9 | 2.9 | Good | Excellent (0) | Good |
| Comparative Example 1 | 36.5 | 20.8 | 0.6 | Good | Poor (10) | Poor |
| Comparative Example 2 | 18.1 | 15.1 | 0.8 | Good | Poor (16) | Poor |
| Comparative Example 3 | 33.9 | 22.5 | 0.7 | Good | Poor (7) | Poor |
| Comparative Example 4 | 30.2 | 21.1 | 0.7 | Good | Poor (6) | Poor |
| Comparative Example 5 | 5.6 | 24.1 | 4.3 | Poor | Excellent (0) | Poor |

TABLE 2

| | Diameter reduction rate % | Outer-surface resin Resins | Melting point ° C. | Surface treatment | Partial heating temperature ° C. |
|---|---|---|---|---|---|
| Example 4 | 5.9 | PBT-containing | 218 | Chromate phosphate | 195 |
| Example 9 | 5.9 | PETIA | 218 | Chromate phosphate | 210 |
| Example 12 | 5.9 | | 218 | Chromate phosphate | 230 |
| Comparative Example 1 | 5.9 | PBT-containing PETIA | 218 | Chromate phosphate | No heating |
| Comparative Example 4 | 5.9 | | 218 | Chromate phosphate | 180 |

| | Timing of partial heating | Outer surface after retort Maximum peak intensity in range satisfying $15° \leq 2\Theta \leq 19$ | | | Evaluation of delamination of outer-surface neck portion after retort |
|---|---|---|---|---|---|
| | | Iu cps/μm | Im cps/μm | Im/Iu | |
| Example 4 | c | 11.3 | 11.9 | 1.1 | Excellent (0) |
| Example 9 | c | 3.0 | 13.1 | 4.4 | Excellent (0) |
| Example 12 | c | 1.5 | 18.6 | 12.4 | Excellent (0) |
| Comparative Example 1 | — | 16.5 | 12.8 | 0.8 | Poor (10) |
| Comparative Example 4 | c | 18.5 | 14.7 | 0.8 | Poor (6) |

TABLE 3

| | Diameter reduction rate % | Inner-surface resin Resins | Melting point ° C. (lower layer) | Surface treatment | Partial heating temperature ° C. | Timing of partial heating |
|---|---|---|---|---|---|---|
| Example 4 | 5.9 | PETIA2 layer | 215 | Chromate phosphate | 195 | c |
| Example 9 | 5.9 | | 215 | Chromate phosphate | 210 | c |
| Example 12 | 5.9 | | 215 | Chromate phosphate | 230 | c |
| Comparative Example 1 | 5.9 | PETIA2 layer | 215 | Chromate phosphate | No heating | — |
| Comparative Example 4 | 5.9 | | 215 | Chromate phosphate | 180 | c |

| | Inner surface of manufactured can | | | | | | Inner surface after retort | | | | | | Evaluation of scratch delamination of inner-surface after retort |
|---|---|---|---|---|---|---|---|---|---|---|---|---|---|
| | Wm | Wu | Wm/Wu | MOm | MOu | MOm/MOu | Wm | Wu | Wm/Wu | MOm | MOu | MOm/MOu | |
| Example 4 | 16.19 | 24.42 | 0.66 | 4.89 | 1.95 | 2.51 | 16.13 | 19.10 | 0.84 | 4.72 | 1.78 | 2.65 | Good |
| Example 9 | 15.81 | 26.30 | 0.60 | 5.23 | 1.07 | 4.89 | 14.95 | 20.35 | 0.73 | 5.75 | 1.01 | 5.68 | Good |
| Example 12 | 15.69 | 26.25 | 0.60 | 5.19 | 1.04 | 4.99 | 15.48 | 20.49 | 0.76 | 4.81 | 1.11 | 4.31 | Good |

TABLE 3-continued

| | | | | | | | | | | | | |
|---|---|---|---|---|---|---|---|---|---|---|---|---|
| Comparative Example 1 | 15.24 | 16.60 | 0.92 | 3.18 | 2.85 | 1.12 | 15.49 | 17.28 | 0.90 | 5.07 | 2.95 | 1.72 | Good |
| Comparative Example 4 | 15.45 | 15.78 | 0.98 | 5.54 | 3.40 | 1.63 | 15.56 | 18.09 | 0.86 | 5.28 | 2.68 | 1.97 | Good |

TABLE 4

| | Diameter reduction rate % | Inner-surface resin | | Surface treatment | Partial heating temperature ° C. | Timing of partial heating |
|---|---|---|---|---|---|---|
| | | Resins | Melting point ° C. | | | |
| Example 13 | 20.9 | Homo-PET | 254 | Chromate phosphate | 195 | c |
| Example 14 | 20.9 | | 254 | Chromate phosphate | 210 | c |
| Example 15 | 20.9 | | 254 | Chromate phosphate | 230 | c |
| Comparative Example 6 | 20.9 | Homo-PET | 254 | Chromate phosphate | No heating | — |
| Comparative Example 7 | 20.9 | | 254 | Chromate phosphate | 180 | c |

| | Inner surface of manufactured can | | | | | | Inner surface after retort | | | | | | Evaluation of scratch delamination of inner-surface after retort |
|---|---|---|---|---|---|---|---|---|---|---|---|---|---|
| | Wm | Wu | Wm/Wu | MOm | MOu | MOm/MOu | Wm | Wu | Wm/Wu | MOm | MOu | MOm/MOu | |
| Example 13 | 15.10 | 15.58 | 0.97 | 5.87 | 3.07 | 1.91 | 14.79 | 15.06 | 0.98 | 5.49 | 3.90 | 1.41 | Good |
| Example 14 | 15.19 | 14.85 | 1.02 | 5.90 | 2.91 | 2.02 | 14.91 | 14.65 | 1.02 | 5.55 | 3.57 | 1.55 | Good |
| Example 15 | 15.11 | 19.03 | 0.79 | 5.70 | 1.36 | 4.18 | 14.88 | 19.90 | 0.75 | 5.59 | 1.13 | 4.93 | Good |
| Comparative Example 6 | 15.05 | 17.35 | 0.87 | 5.11 | 4.00 | 1.28 | 14.87 | 15.74 | 0.94 | 5.44 | 4.43 | 1.23 | Poor |
| Comparative Example 7 | 15.00 | 16.68 | 0.90 | 5.72 | 3.67 | 1.56 | 14.29 | 15.13 | 0.94 | 5.94 | 4.35 | 1.36 | Poor |

TABLE 5

| | Diameter reduction rate % | Inner-surface resin | | Surface treatment | Partial heating temperature ° C. | Timing of partial heating |
|---|---|---|---|---|---|---|
| | | Resins | Melting point ° C. (lower layer) | | | |
| Example 16 | 20.9 | PETIA2 layer | 215 | Zr-based | No heating | c |
| Example 17 | 20.9 | | 215 | Zr-based | 200 | c |
| Example 18 | 20.9 | | 215 | Zr-based | 220 | c |
| Example 19 | 20.9 | | 215 | Only degreasing | 220 | c |
| Comparative Example 8 | 20.9 | PETIA2 layer | 215 | Only degreasing | No heating | — |
| Comparative Example 9 | 20.9 | | 215 | Only degreasing | 200 | c |

| | Inner surface of manufactured can | | | | | | Inner surface after retort | | | | | | Evaluation of scratch delamination of inner-surface after retort |
|---|---|---|---|---|---|---|---|---|---|---|---|---|---|
| | Wm | Wu | Wm/Wu | MOm | MOu | MOm/MOu | Wm | Wu | Wm/Wu | MOm | MOu | MOm/MOu | |
| Example 16 | 15.43 | 17.32 | 0.89 | 5.06 | 3.58 | 1.41 | 15.62 | 16.12 | 0.97 | 5.38 | 3.43 | 1.57 | Good |
| Example 17 | 16.05 | 16.60 | 0.97 | 4.73 | 3.16 | 1.50 | 15.45 | 39.28 | 0.95 | 4.73 | 3.43 | 1.38 | Good |
| Example 18 | 15.83 | 16.52 | 0.96 | 4.31 | 2.83 | 1.52 | 15.68 | 37.78 | 0.94 | 5.03 | 3.12 | 1.61 | Good |
| Example 19 | 14.50 | 16.75 | 0.87 | 3.96 | 2.50 | 1.58 | 15.21 | 16.68 | 0.91 | 4.37 | 2.96 | 1.48 | Good |
| Comparative Example 8 | 15.44 | 18.90 | 0.82 | 4.85 | 3.34 | 1.45 | 15.70 | 15.59 | 1.01 | 3.89 | 3.20 | 1.21 | Poor |
| Comparative Example 9 | 14.50 | 16.75 | 0.87 | 3.82 | 3.31 | 1.58 | 14.62 | 16.25 | 0.90 | 4.07 | 3.22 | 1.26 | Poor |

In the seamless can of the present disclosure, even when the seamless can is exposed to high-temperature high-humidity conditions such as a retort sterilization treatment, the occurrence of retort brushing is suppressed, and even when the entire can is exposed to high-temperature conditions during heating for the purpose of removing a lubricant and alleviating forming strain in the can manufacturing, whitening such as white streaks are effectively suppressed, the occurrence of peeling of the resin coating of the neck portion is also effectively suppressed. Therefore, the seamless can be suitably used as a container for filling contents that require a retort sterilization treatment, a steaming treatment, or the like.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A seamless can in which a polyester resin coating is formed on at least an outer surface of a metal sheet, the seamless can comprising:
   a reduced diameter portion obtained by neck processing within a distance of 0% to 15% from a can body uppermost portion with respect to a total height of the seamless can from the can body uppermost portion to a can bottom of the seamless can,
   wherein a ratio Im/Iu is 1.0 or more, where Iu is a value (cps/μm) calculated by dividing a maximum value of peak intensity in a range satisfying $15° \leq 2\theta \leq 19°$ of an outer-surface polyester resin coating based on an X-ray diffraction method at a measurement site in a maximum reduced diameter portion of the reduced diameter portion by a thickness of the polyester resin coating at the measurement site, and Im is a value (cps/μm) calculated by dividing a maximum value of peak intensity in a range satisfying $15° \leq 2\theta \leq 19°$ of an outer-surface polyester resin coating based on an X-ray diffraction method at a measurement site within a distance of 45% to 60% from the can body uppermost portion by a thickness of the outer-surface polyester resin coating at the measurement site.

2. The seamless can according to claim 1, wherein the maximum reduced diameter portion has a diameter reduced at a diameter reduction rate of 6% or less with respect to a diameter of the can body at a position of 15% to 60% from the can body uppermost portion.

3. The seamless can according to claim 1, wherein the outer-surface polyester resin coating contains 40 mass % to 80 mass % of ethylene terephthalate and 20 mass % to 60 mass % of butylene terephthalate as main constituents.

4. The seamless can according to claim 1, wherein a printed layer is formed on the outer-surface polyester resin coating layer in at least a portion of the reduced diameter portion.

5. The seamless can according to claim 1, wherein a polyester resin coating having polyethylene terephthalate as a main component is formed on an inner surface of the metal sheet as a resin coating.

6. The seamless can according to claim 5, wherein a ratio Wm/Wu is 0.85 or less, where Wu is a full width at half maximum (FWHM) ($cm^{-1}$) of a peak near 1,730 $cm^{-1}$ based on microscopic Raman spectroscopy of the inner-surface polyester-resin-coated surface at the maximum reduced diameter portion, and Wm is a full width at half maximum (FWHM) ($cm^{-1}$) of a peak near 1,730 $cm^{-1}$ based on the microscopic Raman spectroscopy of the inner-surface polyester-resin-coated surface at a position within 45% to 60% of the distance from the can body uppermost portion.

7. The seamless can according to claim 5, wherein an orientation index MOu based on the microscopic Raman spectroscopy of the inner-surface polyester-resin-coated surface at the maximum reduced diameter portion is 2.40 or less.

8. The seamless can according to claim 7, wherein a ratio MOm/MOu of an orientation index MOm obtained by the microscopic Raman spectroscopy of the inner-surface polyester-resin-coated surface at a position within 45% to 60% of the distance from the can body uppermost portion to the orientation index MOu is 2.10 or more.

* * * * *